US010889012B2

(12) United States Patent
Morimura (10) Patent No.: US 10,889,012 B2
(45) Date of Patent: Jan. 12, 2021

(54) MACHINE TOOL

(71) Applicant: OKUMA Corporation, Aichi (JP)

(72) Inventor: Shoichi Morimura, Aichi (JP)

(73) Assignee: OKUMA CORPORATION, Aichi (JP)

( * ) Notice: Subject to any disclaimer, the term of this patent is extended or adjusted under 35 U.S.C. 154(b) by 0 days.

(21) Appl. No.: 15/668,172

(22) Filed: Aug. 3, 2017

(65) Prior Publication Data

US 2018/0126567 A1    May 10, 2018

(30) Foreign Application Priority Data

Aug. 4, 2016 (JP) .................................. 2016-153336

(51) Int. Cl.
| | | |
|---|---|---|
| *B25J 19/00* | (2006.01) | |
| *B23Q 11/00* | (2006.01) | |
| *B08B 1/00* | (2006.01) | |
| *B23Q 17/09* | (2006.01) | |
| *B23Q 17/12* | (2006.01) | |

(Continued)

(52) U.S. Cl.
CPC ............. *B25J 19/0058* (2013.01); *B08B 1/00* (2013.01); *B08B 3/02* (2013.01); *B23B 3/06* (2013.01); *B23Q 11/00* (2013.01); *B23Q 11/005* (2013.01); *B23Q 11/1076* (2013.01); *B23Q 17/09* (2013.01); *B23Q 17/0985* (2013.01); *B23Q 17/12* (2013.01); *B25J 15/0019* (2013.01); *B25J 19/0075* (2013.01); *B25J 19/02* (2013.01); *B25J 9/042* (2013.01); *B25J 21/00* (2013.01); *Y10S 901/15* (2013.01); *Y10S 901/44* (2013.01); *Y10S 901/46* (2013.01)

(58) Field of Classification Search
CPC . B25J 19/0058; B25J 19/0075; B23Q 11/005; B23Q 7/04; B08B 3/02
USPC ...... 134/115 R, 56 R, 18, 32, 34, 42, 1, 172, 134/22.1, 104.1; 901/2, 41, 23, 1, 43, 30, 901/19
See application file for complete search history.

(56) References Cited

U.S. PATENT DOCUMENTS

| | | | | |
|---|---|---|---|---|
| 2,315,393 A | * | 3/1943 | Bowerman | ............ B23Q 3/101 82/152 |
| 3,747,129 A | * | 7/1973 | Dyar | ....................... E03D 9/002 4/662 |

(Continued)

FOREIGN PATENT DOCUMENTS

| | | |
|---|---|---|
| CN | 104812536 A | 7/2015 |
| CN | 105579192 A | 5/2016 |

(Continued)

OTHER PUBLICATIONS

JPO Notice of Grounds for Rejection for the corresponding JP Application No. 2016-153336; dated Jan. 21, 2020.

(Continued)

*Primary Examiner* — David G Cormier
*Assistant Examiner* — Thomas Bucci
(74) *Attorney, Agent, or Firm* — Cantor Colburn LLP (57) ABSTRACT

A machine tool which removal-machines a workpiece by a tool includes an in-machine robot provided in a machining chamber, and a cleaning mechanism that cleans the in-machine robot by removing an adhering substance adhering to the in-machine robot. When the in-machine robot is cleaned, the in-machine robot moves relative to the cleaning mechanism and positions in proximity to the cleaning mechanism.

6 Claims, 5 Drawing Sheets

(51) Int. Cl.
*B23Q 11/10* (2006.01)
*B08B 3/02* (2006.01)
*B23B 3/06* (2006.01)
*B25J 15/00* (2006.01)
*B25J 19/02* (2006.01)
B25J 9/04 (2006.01)
B25J 21/00 (2006.01)

(56) References Cited

U.S. PATENT DOCUMENTS

| | | | | |
|---|---|---|---|---|
| 4,612,832 A * | 9/1986 | Ushigoe | | B23B 3/167 29/36 |
| 4,838,135 A * | 6/1989 | Hevoyan | | B23Q 7/04 82/124 |
| 5,168,609 A * | 12/1992 | Kojima | | B23B 3/06 29/27 R |
| 6,215,268 B1 * | 4/2001 | Choi | | B08B 3/02 134/95.2 |
| 6,723,174 B2 * | 4/2004 | Nelson | | H01L 21/67769 134/33 |
| 7,360,271 B2 * | 4/2008 | Nordstrom | | B08B 1/04 15/104.05 |
| 8,627,740 B2 * | 1/2014 | Skourup | | B25J 19/0075 74/490.01 |
| 9,308,644 B2 * | 4/2016 | Hsieh | | B23Q 1/5493 |
| 9,840,886 B1 * | 12/2017 | Gable | | E21B 33/076 |
| 10,307,877 B2 * | 6/2019 | Morimura | | B25J 11/005 |
| 10,603,752 B2 * | 3/2020 | Morimura | | B25J 9/0096 |
| 10,632,611 B2 * | 4/2020 | Morimura | | B23Q 11/10 |
| 2005/0155626 A1 | 7/2005 | Nordstorm et al. | | |
| 2006/0065284 A1 * | 3/2006 | Langeder | | B23K 9/328 134/1 |
| 2006/0151013 A1 * | 7/2006 | Tsuneta | | F24F 3/1607 134/76 |
| 2006/0180181 A1 * | 8/2006 | Stockert | | B08B 3/02 134/30 |
| 2007/0151580 A1 * | 7/2007 | Salamanca | | B08B 3/02 134/18 |
| 2007/0256714 A1 * | 11/2007 | Binder | | B23K 9/32 134/43 |
| 2007/0267043 A1 * | 11/2007 | Salamanca | | B61K 13/00 134/6 |
| 2009/0101179 A1 * | 4/2009 | Salamanca | | B08B 3/024 134/24 |
| 2009/0143206 A1 * | 6/2009 | Terazono | | B23B 31/39 483/20 |
| 2010/0028117 A1 * | 2/2010 | Nihei | | B25J 9/0009 414/728 |
| 2010/0061830 A1 * | 3/2010 | Kitayama | | B23Q 7/04 414/222.05 |
| 2010/0288088 A1 * | 11/2010 | Miyamoto | | B23Q 1/76 82/1.11 |
| 2011/0030723 A1 * | 2/2011 | Langeder | | B08B 7/00 134/1 |
| 2012/0006363 A1 * | 1/2012 | Milojevic | | B08B 3/024 134/62 |
| 2013/0011234 A1 * | 1/2013 | Pretlove | | B25J 5/005 414/749.1 |
| 2013/0233359 A1 * | 9/2013 | Meissner | | B08B 3/02 134/134 |
| 2015/0033898 A1 * | 2/2015 | Hsieh | | B23Q 7/04 74/490.06 |
| 2015/0209839 A1 * | 7/2015 | Brown | | B25J 21/00 134/18 |
| 2015/0241872 A1 * | 8/2015 | Huang | | B08B 3/022 700/113 |
| 2015/0321362 A1 * | 11/2015 | Nakanishi | | B25J 21/00 277/500 |
| 2015/0375390 A1 * | 12/2015 | Becroft | | B24B 27/0007 427/427.2 |
| 2016/0023251 A1 * | 1/2016 | Mitsue | | B25J 21/00 134/134 |
| 2016/0031088 A1 * | 2/2016 | Suzuki | | B23Q 11/0891 414/222.08 |
| 2016/0084633 A1 * | 3/2016 | Ferrari | | G01B 21/04 33/503 |
| 2016/0116017 A1 * | 4/2016 | Ebihara | | F16M 7/00 248/550 |
| 2016/0167147 A1 | 6/2016 | Yoshizaki | | |
| 2016/0167187 A1 | 6/2016 | Burkhardt et al. | | |
| 2016/0214805 A1 * | 7/2016 | Ebihara | | B23Q 7/04 |
| 2016/0325386 A1 * | 11/2016 | Farah | | B23K 37/047 |
| 2016/0339553 A1 * | 11/2016 | Nakazawa | | B23Q 11/10 |
| 2017/0008177 A1 * | 1/2017 | Ebihara | | B25J 19/0075 |
| 2017/0043442 A1 * | 2/2017 | Takikawa | | B05B 13/0431 |
| 2017/0113314 A1 * | 4/2017 | Murota | | B23Q 17/2457 |
| 2017/0312875 A1 * | 11/2017 | Kunihiro | | B25J 13/085 |
| 2017/0329316 A1 * | 11/2017 | Morimura | | B23P 23/02 |
| 2018/0056503 A1 * | 3/2018 | Morimura | | B25J 9/0015 |
| 2018/0093380 A1 * | 4/2018 | Yoshida | | B25J 13/088 |

FOREIGN PATENT DOCUMENTS

| | | |
|---|---|---|
| CN | 105689828 A | 6/2016 |
| JP | H05301141 A | 11/1993 |
| JP | H05301142 A | 11/1993 |
| JP | H7601 U | 1/1999 |
| JP | 11254317 A | 9/1999 |
| JP | 2010036285 A | 2/2010 |
| JP | 2010052102 A | 3/2010 |
| JP | 2010064158 A | 3/2010 |

OTHER PUBLICATIONS

CNIPA First Office Action; corresponding to CN Application No. 2017106568695, dated Jun. 4, 2020.

* cited by examiner

MACHINE TOOL

CROSS REFERENCE TO RELATED APPLICATION

The present invention claims priority under 35 U.S.C. § 119 to Japanese Patent Application No. 2016-153336 filed on Aug. 4, 2016, the entire content of which is incorporated herein by reference.

TECHNICAL FIELD

The present disclosure relates to a machine tool that removal-machines a workpiece by means of a tool.

BACKGROUND

In the related art, machine tools which removal-machine a workpiece by means of a tool are known. In such machine tools, demands for automation and higher performance are increasing, and, in order to realize automation, some propose provision of a robot. For example, JP 2010-36285 A discloses a technique for attaching and detaching a workpiece to and from a machine tool using a robot provided outside of the machine tool. JP 2010-64158 A discloses a technique in which there is provided an articulated robot which travels on a gantry rail attached on an upper part of the machine tool, and the workpiece is transported or the like among a plurality of machine tools by the articulated robot. However, in general, a body part of the machine tool is covered with a cover in consideration of safety and the surrounding environment. Therefore, when an inside of a machining chamber is to be accessed using a robot provided at a location other than the body part of the machine tool as in JP 2010-36285 A and JP 2010-64158 A, a door of the machining chamber must be opened. Thus, with the robots of JP 2010-36285 A and JP 2010-64158 A, it is possible to attach or detach a workpiece when the workpiece is not being machined, but during machining; that is, in a state where the door of the machining chamber is closed, the robot cannot access the workpiece or the tool. As a result, the usages of the robot are limited with the techniques of JP 2010-36285 A and JP 2010-64158 A.

In consideration of the above, there also has been proposed provision of the robot in the machining chamber. For example, JP H5-301141 A and JP H5-301142 A disclose a workpiece transporting tool which transports the workpiece by an open/close operation of a gripping unit. The transporting tool has an arm shape, and is attached on a body function box. Further, the body function box is provided at a right side part of a spindle head which supports a spindle. The transporting tool can turn around an axis which is approximately orthogonal to a major axis of the spindle. The transporting tool is further configured to change, by the turning, between a state where the arm is approximately horizontal and a state where the arm is approximately vertical.

When the workpiece is to removal-machined by means of a tool, for example, when the workpiece is cut-machined, removed dust such as swarf would be scattered around the tool. When the robot (transporting tool) is provided in the machining chamber as in JP H5-301141 A and JP H5-301142 A, there has been a problem in that the scattered removed dust adheres on the robot. When the removed dust adheres on the joint of the robot or the like, there is a possibility that driving of the robot is obstructed. In addition, when the robot accesses the tool or the workpiece in a state where the removed dust remains adhering to the robot, there is a possibility that the tool or the workpiece is damaged or the precision of the work by the robot is reduced. Thus, in the technique of the related art, even if a robot is provided in the machining chamber, capabilities thereof cannot be appropriately maintained.

An advantage of the present disclosure lies in provision of a machine tool which can appropriately maintain the capabilities of the robot in the machining chamber.

SUMMARY

According to one aspect of the present disclosure, there is provided a machine tool that removal-machines a workpiece by means of a tool, comprising: a robot provided in a machining chamber; and a cleaning mechanism that cleans the robot by removing an adhering substance which adheres to the robot, wherein, when the robot is cleaned, the robot moves relative to the cleaning mechanism and positions in proximity to the cleaning mechanism.

According to another aspect of the present disclosure, the cleaning mechanism may be fixedly placed in the machining chamber, the robot can move and change its orientation in the machining chamber, and when the robot is cleaned, the robot may move and change the orientation to change a location of the robot to be cleaned by the cleaning mechanism.

According to another aspect of the present disclosure, the cleaning mechanism may comprise an ejection mechanism that ejects fluid with respect to the robot, so as to remove the adhering substance.

According to another aspect of the present disclosure, the cleaning mechanism may comprise a contact removal mechanism that contacts at least one of the robot and the adhering substance, to remove the adhering substance.

According to another aspect of the present disclosure, the cleaning mechanism may comprise a cutting mechanism that cuts and fractionates the adhering substance.

According to another aspect of the present disclosure, the machine tool may further comprise a cover which covers an inside of the machining chamber.

According to the machine tool of various aspects of the present disclosure, because a cleaning mechanism is provided, a robot provided in a machining chamber can be cleaned, and the capabilities of the robot can be appropriately maintained.

BRIEF DESCRIPTION OF DRAWINGS

Embodiment(s) of the present disclosure will be described by reference to the following figures, wherein.

DESCRIPTION OF EMBODIMENTS

Figure 1:
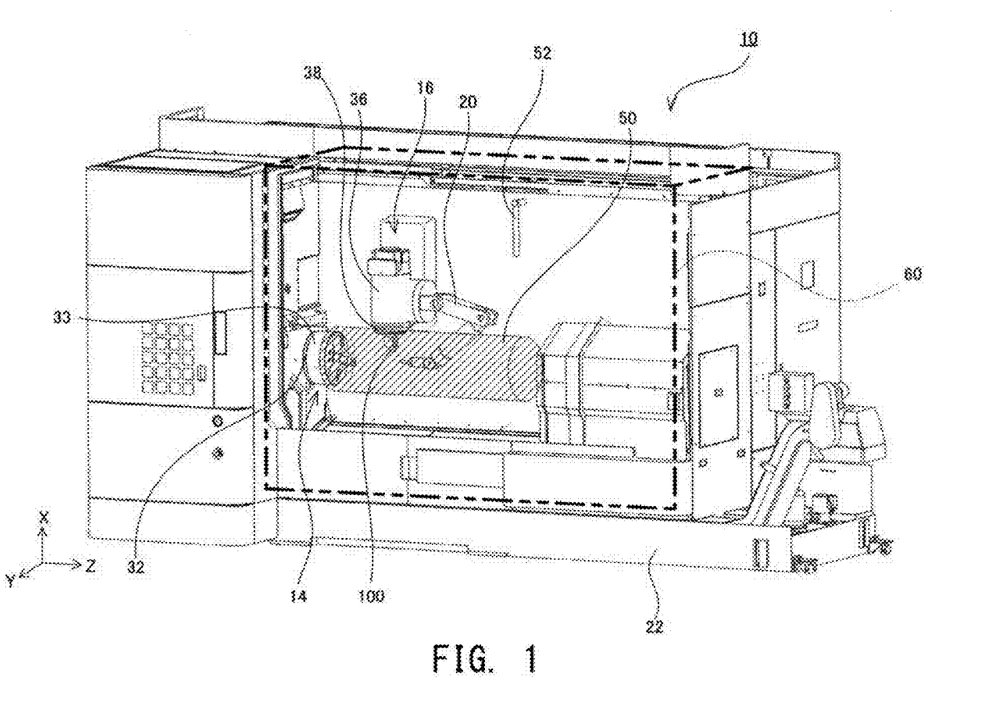
FIG. 1 is a perspective view of a machine tool.

A structure of a machine tool 10 will now be described with reference to the drawings. FIG. 1 is a diagram schematically showing a structure of the machine tool 10. In the following description, a rotation axis direction of a workpiece spindle 32 will be referred to as a Z-axis, a vertical direction orthogonal to the Z-axis will be referred to as an X-axis, and a direction orthogonal to the Z-axis and the X-axis will be referred to as a Y-axis. In the following description, the description of "access" refers to an action that an end effector 46 moves close to a target or an area, to a position where an objective of an operation of the end effector 46 can be achieved. Therefore, when the end effector 46 is a temperature sensor which detects temperature by contacting a target, the description "access" means that the end effector 46 moves close to the target, to a position to contact the target. Alternatively, when the end effector 46 is a temperature sensor which detects temperature without contact, the description "access" means that the end effector 46 moves close to the target, to a position where the temperature of the target can be detected by the end effector 46.

The machine tool 10 is a machine which cut-machines a workpiece by means of a tool. More specifically, the machine tool is a composite machine having a lathe-turning function to cut the workpiece by causing a lathe-turning tool (not shown) to contact the workpiece while rotating the workpiece, and a rotation-cutting function to cut the workpiece with a rotating tool. In FIG. 1, a portion hatched by slanted lines shows a machining area 50 in which machining of the workpiece by a tool 100 is executed. The machining area 50 in the machine tool 10 is approximately equal to an occupied area of a workpiece of a maximum size, among workpieces that can be held by a workpiece spindle device 14. A periphery of the machine tool 10 is covered by a cover 60. A space partitioned by the cover 60 is a machining chamber where the machining of the workpiece is executed. By provision of such a cover 60, spread of swarf or the like to the outside is prevented. On the cover 60, at least one opening and a door which opens and closes the opening (both of which are not shown) are provided. An operator accesses the inside of the machine tool 10 and the workpiece, or the like through the opening. During machining, the door provided on the opening is closed. This is for the sake of safety and the surrounding environment.

The machine tool 10 comprises the workpiece spindle device 14 which holds a workpiece in a manner to allow self-rotation, a tool spindle device 16 that holds the tool 100 in a manner to allow self-rotation, and a tool post (not shown) which holds a lathe-turning tool. The workpiece spindle device 14 comprises a head stock (not shown) provided on a base 22, and the workpiece spindle 32 attached on the head stock. The workpiece spindle 32 has a chuck 33 and/or a collet which detachably holds the workpiece, and a workpiece to be held can be suitably exchanged. The workpiece spindle 32 self-rotates around a workpiece rotation axis extending in the horizontal direction (Z-axis direction in FIG. 1) as a center.

The tool spindle device 16 functions as a movable structure which can move with respect to a ground-contacting surface of the machine tool. The tool spindle device 16 holds the tool 100, for example, a rotating tool such as a fraise or an end mill, or a tool for lathe-turning such as a bite, in a manner to allow self-rotation, and comprises a spindle head 36 having a drive motor or the like built therein, and a tool spindle 38 attached to the spindle head 36. The tool spindle 38 has a clamper which detachably holds the tool 100, and the tool 100 to be held can be exchanged as necessary. The tool spindle 38 self-rotates with a tool rotation axis Rt which is approximately orthogonal to a swing axis St (refer to FIG. 2) to be described later as a center.

In addition, an in-machine robot 20 is attached to the spindle head 36. The in-machine robot 20 is used for a support of machining, various sensing operations, and an additional work, or the like. A structure and a function of the in-machine robot 20 will be described later in detail.

The spindle head 36 also can swing around the swing axis St (refer to FIG. 2) which passes through the spindle head 36 and which extends in the Y-axis direction. By the spindle head 36 swinging around the swing axis St, orientations of the tool 100 and the in-machine robot 20 are changed. Further, the spindle head 36 can move linearly in the X-axis, Y-axis, and Z-axis directions by a drive mechanism (not shown), and, consequently, the tool 100 and the in-machine robot 20 can also move linearly in the X-axis, Y-axis, and Z-axis directions.

The tool post holds a lathe-turning tool, for example, a tool called a bite. The tool post and the bite can move linearly in the X-axis and Z-axis directions by a drive mechanism (not shown).

At a bottom part in the machining chamber, a discharge mechanism (not shown) which recovers and discharges swarf which is spread during the cut-machining is provided. As the discharge mechanism, various forms may be considered. For example, the discharge mechanism is formed with a conveyer or the like which transports to the outside the swarf fallen due to the force of gravity. Further, on a side surface of the machining chamber, a cleaning mechanism 52 for cleaning the in-machine robot 20 is fixed. A specific structure of the cleaning mechanism 52 will be described later.

The machine tool 10 further comprises a control device which executes various calculations. The control device in the machine tool 10 is also called a numerical control device, and controls driving of various parts of the machine tool 10 in response to an instruction from the operator. The control device comprises, for example, a CPU which executes various calculations, and a memory which stores various control programs and control parameters. In addition, the control device has a communication function, and can exchange various data such as, for example, NC program data or the like, with other devices. The control device may include, for example, a numerical control device which calculates positions of the tool 100 and the workpiece at all times. Further, the control device may be a single device, or may be formed by combining a plurality of calculation devices.

Figure 2:
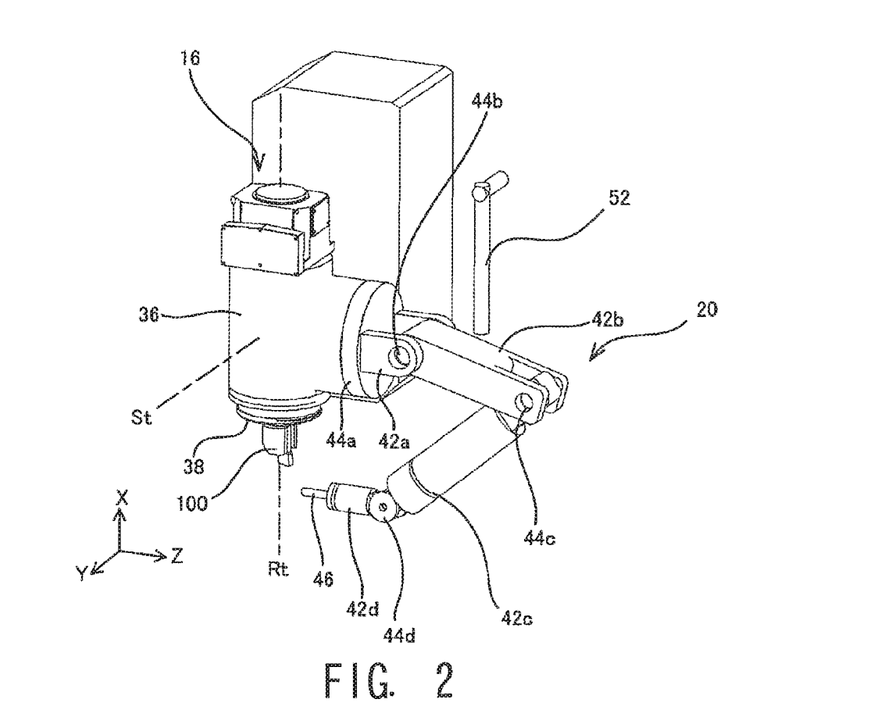
FIG. 2 is a diagram showing cleaning of an in-machine robot.
Figure 3:
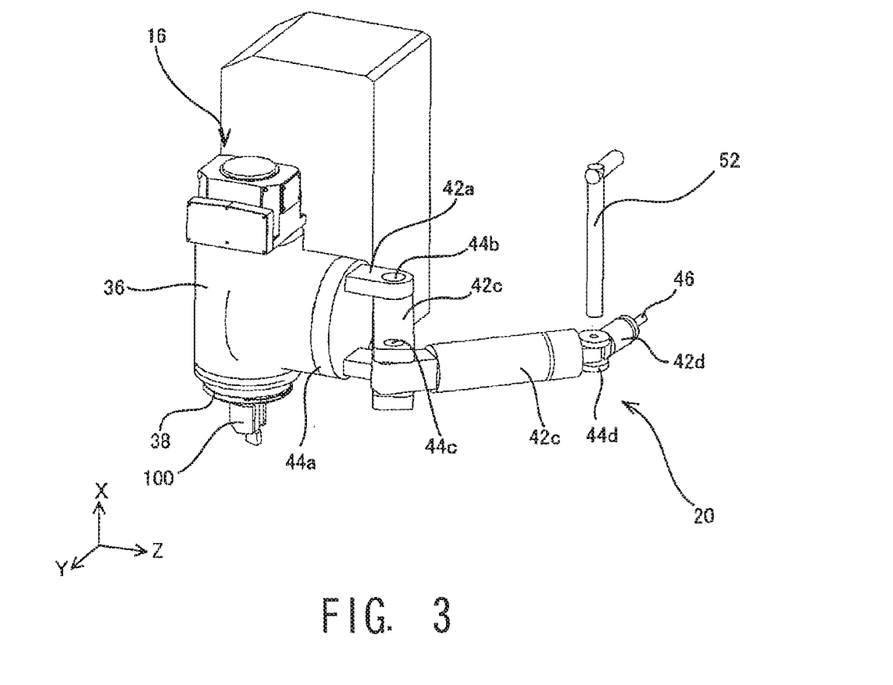
FIG. 3 is a diagram showing cleaning of an in-machine robot.
Figure 4:
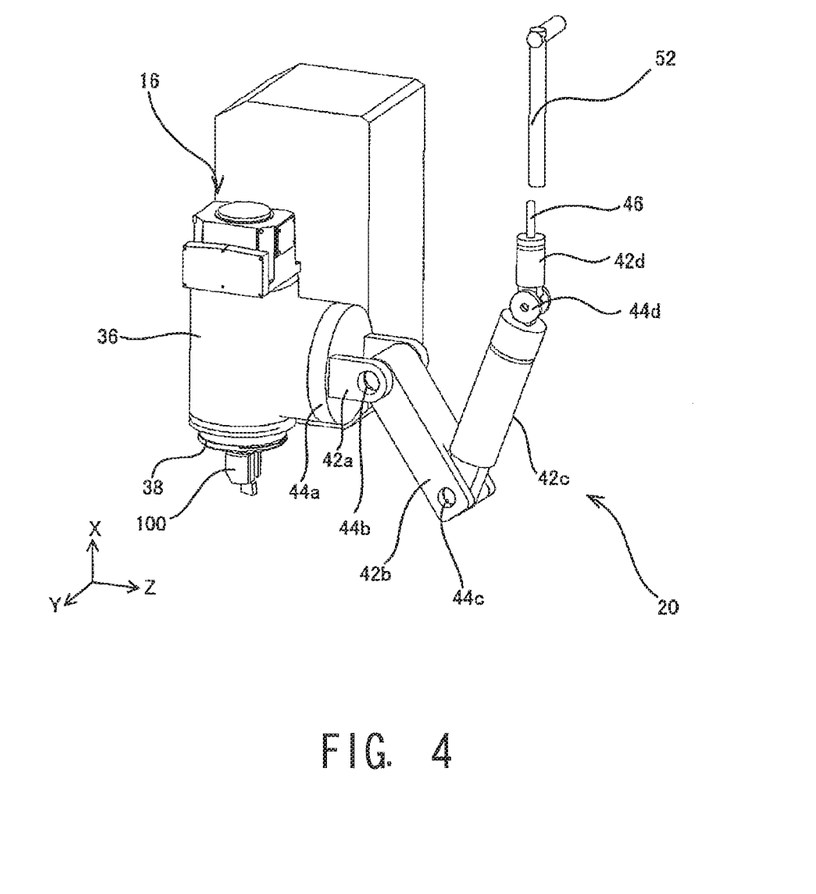
FIG. 4 is a diagram showing cleaning of an in-machine robot.

Next, the in-machine robot 20 attached to the tool spindle device 16 will be described with reference to FIGS. 2-4. FIGS. 2-4 are perspective views of the periphery of the in-machine robot 20. As shown in FIG. 2, the in-machine robot 20 is an articulated robot which has a plurality of arms 42a-42d, and a plurality of joints 44a-44d. In another view, the in-machine robot 20 may be viewed as a serial manipulator in which the plurality of arms 42a-42d and the plurality of joints 44a-44d are continuously connected. The in-machine robot 20 is attached to the spindle head 36. The spindle head 36 has an approximate circular tube shape, and a center axis thereof coincides with the tool rotation axis Rt. As described previously, the spindle head 36 can translate in 3-axes directions, and rotate around the swing axis St.

The in-machine robot 20 comprises the first through fourth arms 42a-42d (hereinafter, when "first" through "fourth" are not to be distinguished, the letter in the reference numeral will be omitted, and the arms will be simply referred to as "arms"; the same convention is applicable to other constituent elements), the first through fourth joints 44a-44d provided at ends of the respective arms, and the end effector 46. A base end of the first arm 42a is connected via the first joint 44a to the tool spindle device 16; a base end of the second arm 42b is connected via the second joint 44b to a tip of the first arm 42a; a base end of the third arm 42c is connected via the third joint 44c to a tip of the second arm 42b; and a base end of the fourth arm 42d is connected via the fourth joint 44d to a tip of the third arm 42c. The first joint 44a has a first rotation axis which is orthogonal to the swing axis St and the tool rotation axis Rt, and the second through fourth joints 44b-44d respectively have second through fourth rotation axes in a direction orthogonal to the first rotation axis. The arms 42 swing around corresponding rotation axes as a center. Therefore, the in-machine robot 20 has four joints, each allowing rotation around one axis, and the in-machine robot 20 as a whole may be said to have 4 degrees of freedom.

On each of the first through fourth joints 44a-44d, an actuator such as a motor is attached, and driving of the actuator is controlled by the control device. The control device calculates the position of the end effector 46 based on an amount of driving of the actuator provided on each of the joints 44a-44d.

At a tip of the fourth arm 42d, the end effector 46 which acts on a target is provided. No particular limitation is imposed on the end effector 46 so long as the end effector 46 achieves some effect. Therefore, the end effector 46 may be, for example, a sensor which senses information related to the target or the peripheral environment of the target. In this case, the end effector 46 may be, for example, a contact sensor which detects presence or absence or contact with the target, a distance sensor which detects a distance to the target, a vibration sensor which detects vibration of the target, a pressure sensor which detects a pressure applied by the target, a sensor which detects the temperature of the target, or the like. A detection result of these sensors is stored and analyzed in correlation to position information of the end effector 46 calculated based on the amounts of driving of the joints 44a-44d. For example, when the end effector 46 is a contact sensor, the control device analyzes a position, a shape, and a motion of the target based on the timing of detection of the contact with the target and the position information at that timing.

As an alternative configuration, the end effector 46 may be a holding mechanism which holds the target. The form of holding may be, for example, a hand form in which the target is gripped with a pair of members, a form in which the target is suctioned and held, or a form in which the target is held using a magnetic force or the like.

As an alternative configuration, the end effector 46 may be a device which outputs fluid for helping the machining. Specifically, the end effector 46 may be a device which discharges air for blowing swarf or cooling fluid (cutting oil or cutting water, or the like) for cooling the tool 100 or the workpiece. Alternatively, the end effector 46 may be a device which discharges energy or a material for workpiece formation. Therefore, the end effector 46 may be, for example, a device which discharges laser or an arc, or a device which discharges a material for layering formation. Further, as an alternative configuration, the end effector 46 may be a camera which captures an image of the target. In this case, the image obtained by the camera may be displayed on an operation panel or the like.

No particular limitation is imposed on the target on which the end effector 46 acts, so long as the target is in the machining chamber; in particular, in the machining area 50. Therefore, the target may be the tool 100 held on the tool spindle 38, or the workpiece held on the workpiece spindle device 14. Further, the target may be the lathe-turning tool held on the tool post. In addition, the target may be other than the tool 100 and the workpiece, for example, the swarf spread in the machining chamber, a component assembled to the workpiece, a constituting component of the machine tool 10 (such as the chuck 33 of the workpiece spindle 32, the collet of the tool spindle 38), or the like.

In the above description, the number of end effector 46 is described as one, but the number of end effectors 46 is not limited to one, and may be a plurality. In addition, it is sufficient that the end effector 46 is provided at least on the in-machine robot 20, and the provision position is not limited to the tip of the articulated arm, and may alternatively be partway on the articulated arm.

In the above description, the in-machine robot 20 is an articulated robot having a plurality of joints 44, but the in-machine robot 20 may alternatively be in other forms, such as, for example, a parallel link robot or the like, so long as the position of the end effector 46 and the orientation of the robot can be changed.

The in-machine robot 20 may be used in various usages. For example, the in-machine robot 20 may help the machining during the machining of the workpiece. Specifically, for example, the in-machine robot 20 supports at least one of the workpiece and the tool 100 during machining. With such a configuration, vibration of the workpiece/tool 100 having a low rigidity may be suppressed. As an alternative configuration, the in-machine robot 20 may hold the workpiece in place of the workpiece spindle device 14 during the machining. With such a configuration, the orientation of the workpiece can be freely changed during the machining, and machining of a complex shape may be enabled. As a further alternative configuration, the in-machine robot 20 may apply vibration to the workpiece or the tool 100 during the machining. Such a configuration enables special machining in which the cutting is executed while vibration is applied. Further, as an alternative configuration, the in-machine robot 20 may discharge cooling fluid (cutting oil, cutting water), or air for removing swarf during the machining. By discharging the cooling fluid or air with the in-machine robot 20 in which the position and orientation thereof can be freely changed, it becomes possible to more freely control the cutting characteristic and the temperature of the workpiece and the tool 100.

The in-machine robot 20 also may execute various sensing processes, for example, during the machining of the workpiece or before or after the machining. Specifically, for example, a cutting state (a machining surface precision and state of swarf) may be monitored by the in-machine robot 20. As an alternative configuration, the in-machine robot 20 may sense a state of the workpiece and the tool 100, for example, the temperature, vibration, distortion, or the like during the machining, and output the sensed result to the control device. In this case, the control device desirably changes various machining conditions (such as the feed rate and rotational velocity) based on information detected by the in-machine robot 20 as necessary. Alternatively, the in-machine robot 20 may have a structure to measure a shape of the workpiece before start of the machining or after completion of the machining. By measuring the shape of the workpiece before the start of the machining, attachment error of the workpiece can be reliably prevented. By measuring the shape of the workpiece after the completion of the machining, the quality of the machining result can be judged. As an alternative configuration, the in-machine robot 20 may measure, for example, the state of the tool 100 (such as an amount of wear and an amount of protrusion) before the start of the machining or after completion of the machining.

Further, the in-machine robot 20 may execute, for example, works that are not directly related to machining. Specifically, the in-machine robot 20 may execute a cleaning work to recover the swarf which is spread in the machining chamber, during the machining or after the completion of the machining. As an alternative configuration, the in-machine robot 20 may execute inspection of the tool (checking presence or absence of wear and an amount of protrusion), or inspection of movable parts of the machine tool 10 during a period in which the machining is not executed.

Further, the in-machine robot 20 may execute works that are executed by an out-of-machine robot in the related art, during the machining or after the completion of the machining. For example, the in-machine robot 20 may execute an additional machining (such as removal machining such as trimming and die polishing, surface reformation, adding machining, or the like) on the workpiece. Further, the in-machine robot 20 may transport, exchange, or set up the workpiece and the tool 100. In addition, the in-machine robot 20 may inspect or assemble various components.

As described, the in-machine robot 20 may be used in various usages. The type of the end effector 46 provided on the in-machine robot 20 may be selected according to the usage demanded for the in-machine robot 20. The in-machine robot 20 is provided in the machining chamber. In particular, the in-machine robot 20 which executes a machining support is provided in proximity to the machining area 50 (for example, on the tool spindle head 36). In this case, removed dust generated due to a removal machining of the workpiece; that is, swarf, tends to adhere to the in-machine robot 20. When the swarf adheres to the joint 44 or the like of the in-machine robot 20, there is a possibility that appropriate driving of the in-machine robot 20 is obstructed. In addition, when the target (the workpiece, the tool 100, or the like) is accessed while the swarf continues to adhere to the end effector 46 or the like, the target may be damaged or precision of various works may be reduced.

Thus, in the machine tool 10 of the present disclosure, the cleaning mechanism 52 is fixed on a wall surface of the machining chamber. As described before, the cleaning mechanism 52 is a mechanism which removes the swarf adhering to the in-machine robot 20, to thereby clean the in-machine robot 20. No particular limitation is imposed on a structure of the cleaning mechanism 52 so long as the swarf can be removed, and, for example, the cleaning mechanism 52 may include an ejection mechanism which ejects fluid such as air and water, to remove the swarf. As an alternative configuration, the cleaning mechanism 52 may include a contact removal mechanism which removes the swarf by causing a contact unit comprising a rotary brush, a scraper, a sponge, a clothing, a scrubber, or the like to contact at least one of the in-machine robot 20 and the swarf. Further, as an alternative configuration, the cleaning mechanism 52 may include a cutting mechanism which suitably cuts and fractionates the swarf wound around the in-machine robot 20. As the cutting mechanism, for example, a cutter such as a rotary cutter, and a crusher such as a shredder may be considered. When the swarf is to be cut, the in-machine robot 20 may be moved so that the cutter or the shredder tracks the surface of the in-machine robot 20. Alternatively, the cleaning mechanism 52 may be a combination of these. For example, the cleaning mechanism 52 may include both of a rotary brush which captures the swarf and an air ejector which blows off fine swarfs.

Of the movable range of the in-machine robot 20, the cleaning mechanism 52 is provided at a position distanced from the machining area 50; more specifically, on a wall surface in the machining chamber. The configuration is for preventing adhesion of the swarf on the cleaning mechanism 52. The cleaning mechanism 52 is also fixed on the wall surface in the machining chamber as described previously, and the position thereof cannot be changed. This is because, when the cleaning mechanism 52 is made movable, a dedicated drive mechanism would be required, which would result in an increase in size and cost of the overall device.

When the in-machine robot 20 is cleaned, the tool spindle device 16 on which the in-machine robot 20 is attached is moved, to move the in-machine robot 20 close to the cleaning mechanism 52. As shown in FIGS. 2-4, while the position and the orientation of the in-machine robot 20 with respect to the cleaning mechanism 52 are sequentially changed, the entirety of the in-machine robot 20 is cleaned. In the example configuration of FIGS. 2-4, first, the first joint 44a of the in-machine robot 20 is moved close to the cleaning mechanism 52, and the swarf around the first joint 44a is removed. Then, the tool spindle device 16 is moved gradually away from the cleaning mechanism 52, the units from the first arm 42a to the end effector 46 are successively moved close to the cleaning mechanism 52, and the swarfs in these units are removed. FIG. 2 shows removal of the swarf of the second arm 42b. FIG. 3 shows removal of the swarf of the fourth joint 44d. FIG. 4 shows removal of the swarf of the end effector 46. As shown in FIGS. 2-4, the orientation of the in-machine robot 20 is suitably changed so that the entire periphery of the in-machine robot 20 can be cleaned. In this manner, in the cleaning, because the orientation and the position of the in-machine robot 20 are changed, even when a simple structure having an unmovable position is employed for the cleaning mechanism 52, the entire periphery of the in-machine robot 20 can be appropriately cleaned.

The swarf removed by the cleaning mechanism 52 primarily falls to the bottom part in the machining chamber. At the bottom part of the machining chamber, a conveyer for discharging the swarf to the outside is provided. The swarf collected by the conveyer is collected to a swarf processor and processed.

No particular limitation is imposed on an execution timing of such cleaning of the in-machine robot 20. Therefore, for example, the cleaning may be executed according to an instruction from a user, or the cleaning may be executed periodically according to a predefined schedule. Alternatively, the cleaning may be executed in connection with a particular event. For example, the cleaning may be executed every time the machining of the workpiece by the tool 100 is completed. Alternatively, a sensor such as a camera may be separately provided, the adhesion situation of the swarf may be monitored, and possibility of execution of the cleaning may be determined.

In any of the above configurations, by providing the cleaning mechanism 52 for cleaning the in-machine robot 20 by removing the swarf adhering to the in-machine robot 20, it is possible to maintain the in-machine robot 20 in an appropriate state. The structures described above are merely exemplary, and the structures may be suitably modified so long as the device comprises the in-machine robot 20 and the cleaning mechanism 52 which cleans the in-machine robot 20.

Figure 5:
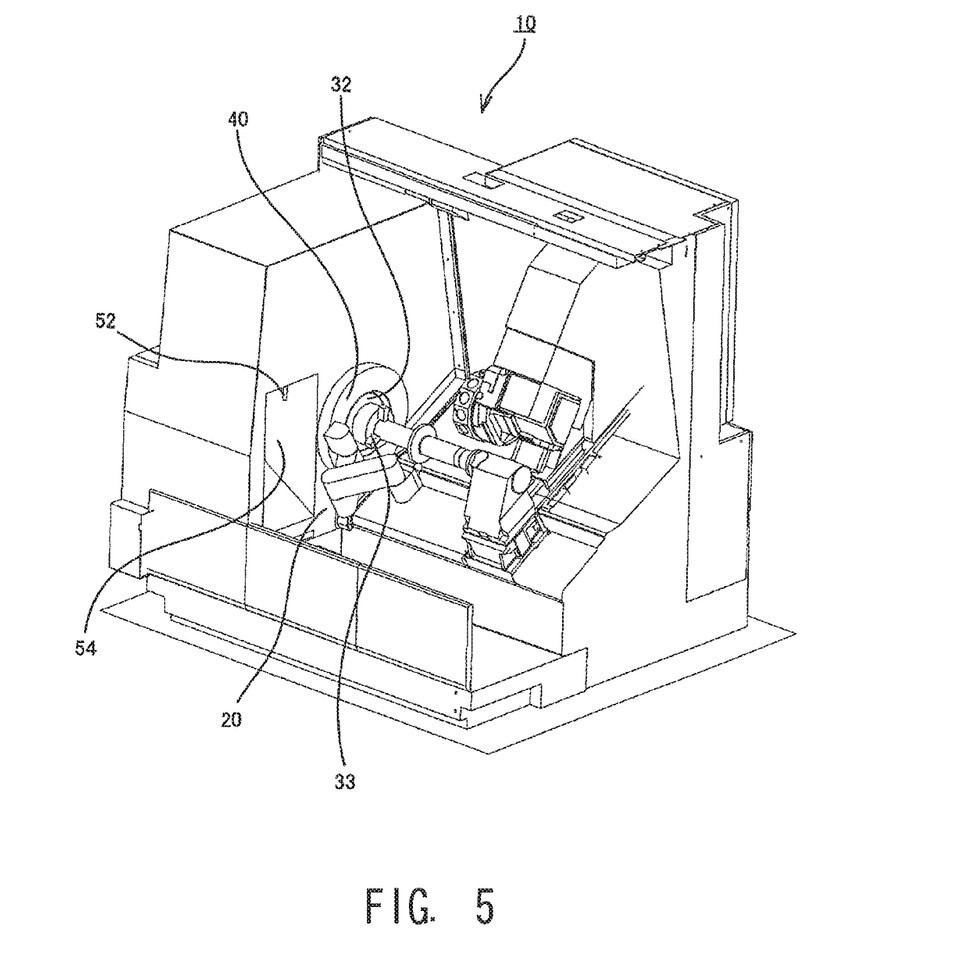
FIG. 5 is a perspective view of another machine tool.
Figure 6:
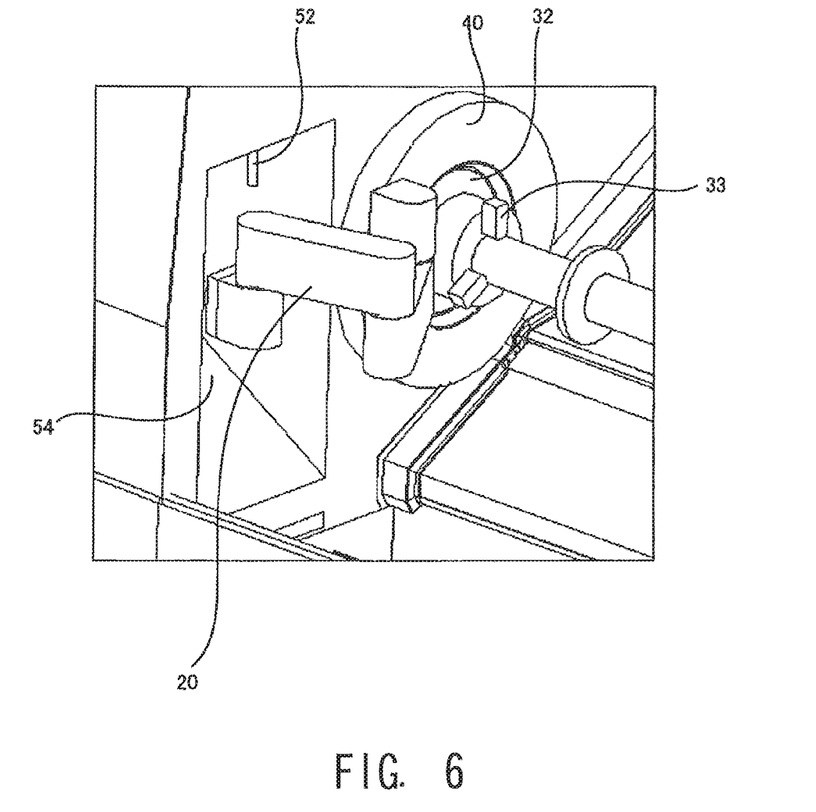
FIG. 6 is a diagram enlarging relevant portions of the machine tool of FIG. 5.

For example, in the above-described configuration, the in-machine robot 20 is attached to the tool spindle device 16, but the in-machine robot 20 may alternatively be attached to other locations, for example, a location in proximity to the workpiece spindle device 14. FIG. 5 is a perspective view showing an example configuration in which the in-machine robot 20 is provided in proximity to the workpiece spindle device 14, and FIG. 6 is an enlarged view of the relevant parts of FIG. 5. As shown in FIGS. 5 and 6, in the machine tool 10, the in-machine robot 20 is attached to an outer periphery of the workpiece spindle 32 via a connection mechanism 40. The connection mechanism 40 is an approximate ring-shaped structure surrounding the outer periphery of the workpiece spindle device 32. The connection mechanism 40 has a hollow rotation joint attached to the workpiece spindle 32. The connection mechanism 40 can rotate with respect to the workpiece spindle 32, and a rotation center thereof coincides with the workpiece rotation axis. The in-machine robot 20 is an articulated robot having a plurality of joints and arms.

In such a machine tool also, the cleaning mechanism 52 for the in-machine robot 20 may be provided. Unlike the tool spindle device 16, the workpiece spindle 32 cannot move linearly, and thus, the movable range of the in-machine robot 20 connected to the workpiece spindle 32 tends to be narrow. Because of this, in this case, the cleaning mechanism 52 is desirably provided in proximity to the in-machine robot 20. However, when the cleaning mechanism 52 is attached in proximity to the in-machine robot 20, and consequently, directly on the wall surface in proximity to the workpiece spindle 32, there is a possibility that the swarf adheres also on the cleaning mechanism 52. Therefore, in this case, as shown in FIGS. 5 and 6, a recess 54 may be provided on the wall surface near the in-machine robot 20, and the cleaning mechanism 52 may be provided in the recess 54. In this case, a bottom surface of the recess 54 is desirably an inclined surface so that the swarf can easily fall downward. When the in-machine robot 20 is cleaned, as shown in FIG. 6, the in-machine robot 20 may enter the recess 54 so that the in-machine robot 20 moves close to the cleaning mechanism 52.

In the above description, the cleaning mechanism 52 is described to have its position unchangeable, but alternatively, the cleaning mechanism 52 may be movable. In addition, the in-machine robot 20 is not limited to the articulated serial manipulator, and may alternatively be a parallel link robot having a plurality of links. Further, the in-machine robot 20 may be provided at a location other than the tool spindle device 16 and the workpiece spindle 32, such as, for example, on the tool post and a tailstock, so long as the in-machine robot 20 is provided in the machining chamber.

The invention claimed is:

1. A machine tool that removal-machines a workpiece by means of a tool, comprising:
    a workpiece spindle device that holds the workpiece;
    a tool spindle device that holds the tool that removal-machines the workpiece;
    a robot provided in a machining chamber; and
    a cleaning mechanism that is disposed inside a recess defined in a side of the machining chamber and cleans the robot by removing an adhering substance which adheres to the robot, the recess being sized such that at least a part of the robot enters the recess, wherein
    when the robot is cleaned, at least a part of the robot moves relative to the cleaning mechanism and enters the recess, and
    the cleaning mechanism cleans the at least a part of the robot that is located in the recess.

2. The machine tool according to claim 1, wherein
    the cleaning mechanism is fixedly placed in the machining chamber,
    the robot can move and change its orientation in the machining chamber, and
    when the robot is cleaned, the robot moves and changes the orientation to change a location of the robot to be cleaned by the cleaning mechanism.

3. The machine tool according to claim 1, wherein
    the cleaning mechanism ejects fluid with respect to the robot, to remove the adhering substance.

4. The machine tool according to claim 1, wherein
    the cleaning mechanism contacts at least one of the robot and the adhering substance, to remove the adhering substance.

5. The machine tool according to claim 1, wherein
    the cleaning mechanism cuts and fractionates the adhering substance.

6. The machine tool according to claim 1, further comprising:
    a cover which covers an inside of the machining chamber.

* * * * *